United States Patent [19]

Inagaki et al.

[11] Patent Number: 4,849,048
[45] Date of Patent: Jul. 18, 1989

[54] METHOD OF SEALING ELECTRIC AND ELECTRONIC PARTS

[75] Inventors: Akio Inagaki, Okazaki; Kiyotaka Nakai, Chita; Hitoshi Tauchi, Toyota, all of Japan

[73] Assignee: Aisin Seiki Kabushiki Kaisha, Kariya, Japan

[21] Appl. No.: 60,167

[22] Filed: Jun. 10, 1987

[30] Foreign Application Priority Data

Jun. 25, 1986 [JP] Japan ................. 61-148384

[51] Int. Cl.⁴ ............... B29C 35/08; B32B 31/28; H05K 3/00
[52] U.S. Cl. .................... 156/275.5; 29/841; 29/855; 29/856; 156/275.7; 156/293; 264/25; 264/260; 264/272.13; 277/1; 277/227
[58] Field of Search ............ 277/1, 227; 156/272.2, 156/275.5, 275.7, 293; 264/22, 25, 260, 272.13; 29/841, 855, 856, 858, 883; 340/52 R, 624

[56] References Cited

U.S. PATENT DOCUMENTS

| | | |
|---|---|---|
| 2,793,970 | 5/1957 | Jeppson .................. 264/22 X |
| 3,364,567 | 1/1968 | Brown et al. ................. 29/856 |
| 3,889,365 | 6/1975 | Brock ..................... 29/856 |
| 4,036,534 | 7/1977 | Kondo et al. . |
| 4,073,835 | 2/1978 | Otsuki et al. ............... 264/22 |
| 4,074,700 | 2/1978 | Engle . |
| 4,316,642 | 2/1982 | Belart . |
| 4,444,806 | 4/1984 | Morgan et al. ......... 156/275.5 X |
| 4,561,469 | 12/1985 | Akagi . |

Primary Examiner—Allan N. Shoap
Attorney, Agent, or Firm—Oblon, Fisher, Spivak, McClelland & Maier

[57] ABSTRACT

A method of sealing electric and electonic parts, comprising employing two different ultraviolet-curing resins for upper and lower layer portions, respectively, the resin employed for the upper layer portion having a smaller specific gravity than that of the resin for the lower layer portion before the resins are cured, and simultaneously curing the resins by irradiation with an ultraviolet ray. The ultraviolet-curing resin employed for the upper layer portion is an epoxy acrylate or epoxy resin, while an urethane acrylate ultraviolet-curing resin is employed for the lower layer portion, and the thickness of the ultraviolet-curing resin employed for the upper layer portion is set at from 0.5 mm to 3 mm.

4 Claims, 2 Drawing Sheets

METHOD OF SEALING ELECTRIC AND ELECTRONIC PARTS

BACKGROUND OF THE INVENTION

1. Field of the Invention

The present invention relates to a method of sealing electric and electronic parts which may be used for, for example, sealing switches employed in brake oil level alarms for automobiles.

2. Description of the Related Art

In a conventional electric parts sealing method related to the present invention, thermosetting epoxy resins have heretofore been used to seal switches employed in brake oil level alarms for automobiles.

However, since hermosetting epoxy resins usually take long periods of time to set, i.e., 1 to 2 hours, ultraviolet-curing resins have been used recently.

There are a variety of ultraviolet-curing resins, among which polyester acrylate, epoxy acrylate, urethane acrylate, epoxy, silicone resins are generally put into practical use (see the September 1981 issue of "Toso Gijutsu (Painting Technique)", p. 15).

Among the above-described ultraviolet-curing resins, polyester acrylate, epoxy acrylate, epoxy and silicone resins can be only cured to a depth of about 2 to 3 mm and therefore cannot be used for switches employed in brake oil level alarms for automobiles which require a curing depth of 5 mm or more.

Urethane acrylate resin can be cured to a depth of 5 mm or more but is inferior in terms of chemical resistance and oil resistance and therefore cannot be used for parts to which oil or the like is readily attached, such as switches for brake oil level alarms.

SUMMARY OF THE INVENTION

In view of the above-described circumstances, it is a primary object of the present invention to provide a method of sealing switches which enables a sealing material to cure to a depth of 5 mm or more and which also provides superior chemical and oil resistances.

To this end, the present invention provides a method of sealing electric and electronic parts in which two different ultraviolet-curing resins are employed for upper and lower layer portions, respectively, the resin employed for the upper layer portion having a smaller specific gravity than that of the resin for the lower layer portion before these resins are cured. An epoxy acrylate or epoxy ultraviolet-curing resin is employed for the upper layer portion, while a urethane acrylate ultraviolet-curing resin is employed for the lower layer portion, and the thickness of the resin employed for the upper layer portion is set at from 0.5 mm to 3 mm.

According to the present invention, immediately after an appropriate amount of an urethane acrylate ultraviolet-curing resin has been cast into a casing, an appropriate amount of either an epoxy acrylate or epoxy ultraviolet-curing resin is cast into the casing, and these resins are simultaneously cured by irradiation with an ultraviolet ray. Thus, the method of the present invention is carried out in three steps, that is, (1) casting a lower layer sealing material, (2) casting an upper layer sealing material, and (3) curing them.

The casting of a lower layer sealing material is carried out using a conventional quantitative discharger as shown in FIG. 1, in which the reference numeral 1 denotes a workpiece, 2 a discharger, and 3 a lower layer sealing material. The lower layer sealing material is preferably a urethane acrylate ultraviolet-curing resin for the purpose of completely curing the lower layer sealing material to the depths therein, and the resin is preferably cast in such an amount that the upper limit S equals 0.5 to 3 mm, as shown in FIG. 2.

In FIG. 2, the reference numeral 1 denotes a workpiece, and 3 a lower layer sealing material, which is cast in the same way as that shown in FIG. 1.

The upper layer sealing material is preferably either an epoxy acrylate or epoxy ultraviolet-curing resin, which have excellent oil resistance. It is necessary to employ an upper layer sealing material having a smaller specific gravity than that of the lower layer sealing material so that the upper layer sealing material is not mixed with the lower layer sealing material. The upper layer sealing material is cast in such an amount that the condition of S=0.5 to 3 mm is satisfied, as shown in FIG. 3, in which the reference numeral 1 denotes a workpiece, 3 a lower layer sealing material, and 4 an upper layer sealing material.

Then, the upper and lower layer sealing materials are simultaneously cured by irradiation with any desired ultraviolet ray using an ultraviolet lamp. Since the lower layer sealing material is an urethane acrylate resin, it is completely cured to a depth of 5 mm or more.

The element sealed in this way has no fear of its performance being deteriorated even if oil or the like is attached thereto since the upper layer is formed from either an epoxy acrylate or epoxy ultraviolet-curing resin, which are superior in terms of both oil and chemical resistances.

The above and other objects, features and advantages of the present invention will become more apparent from the following description of the present invention taken in conjunction with the accompanying drawings.

DESCRIPTION OF THE PREFERRED EMBODIMENTS

The present invention will be described hereinunder in greater detail by way of examples and comparative examples.

EXAMPLE 1

Figure 1:
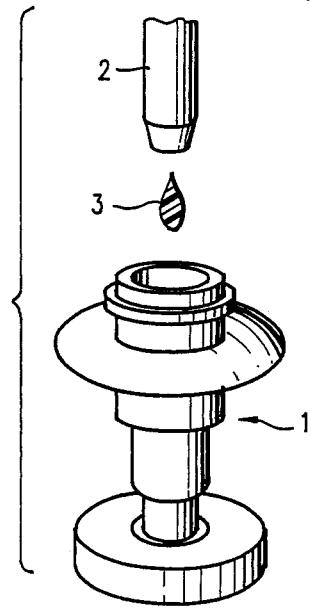
FIG. 1 shows a method of sealing a switch with a resin.
Figure 2:
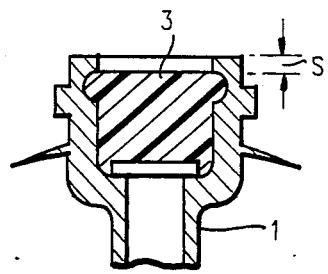
FiG. 2 is a sectional view of a sealed portion.
Figure 3:
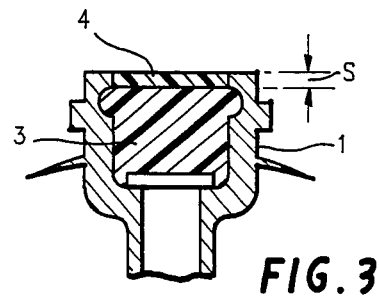
FiG. 3 is a sectional view of a portion which is sealed with two layers of different sealing materials.
Figure 4:
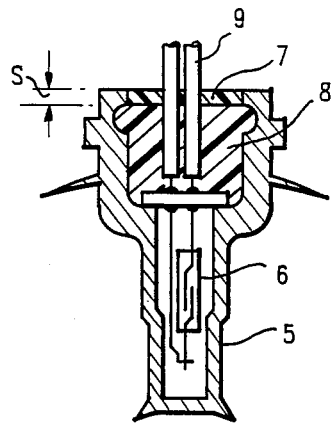
FiG. 4 is a sectional view showing an example of the present invention.

Referring to FIG. 4, the reference numeral 5 denotes a casing, 6 a reed switch, 7 an upper layer sealing material, 8 a lower layer sealing material, and 9 lead wires.

As the upper layer sealing material 7, an epoxy ultraviolet-curing resin (SBX416-3, manufactured by Asahi Denka Kogyo K.K.) having a specific gravity of 1.21 was employed, while, as the lower layer sealing material 8, an urethane acrylate ultraviolet-curing resin (ASCUR-001, manufactured by Aisin Seiki Co., Ltd.) having a specific gravity of 1.28, and these resins were simultaneously cured by irradiation with an ultraviolet ray for one minute using a 2 KW metal halide lamp (manufactured by Matsushita Electric Works, Ltd.) at an irradiation distance of 100 mm.

Although the upper layer sealing material was cast immediately after the lower layer sealing material had been cast, the two sealing materials were not mixed together but instead were cured in two layers, respectively, which were completely separated from each other. The switch thus prepared was dipped in a brake oil at 120° C. for 72 hours to examine the sealing properties. There was no abnormality in the external appearance of the switch, and the insulation resistance between the lead wires showed $5 \times 10^7 \Omega$.

COMPARATIVE EXAMPLE 1

Figure 5:
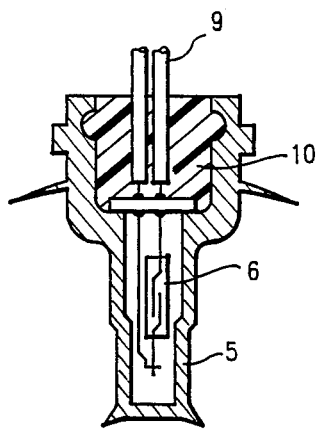
FIG. 5 is a sectional view showing one comparative example.

FIG. 5 shows a comparative example in which a urethane acrylate ultraviolet-curing resin alone was employed to seal a switch. In the figure, the reference numeral 10 denotes an urethane acrylate ultraviolet-curing resin (S771-3, manufactured by Three Bond) which was cured under the same conditions as in Example 1.

When the switch thus prepared was dipped in a brake oil at 120° C. for 72 hours, the sealing material swelled, and the insulation resistance between the lead wires lowered to $1 \times 10^5 \Omega$.

COMPARATIVE EXAMPLE 2

Figure 6:
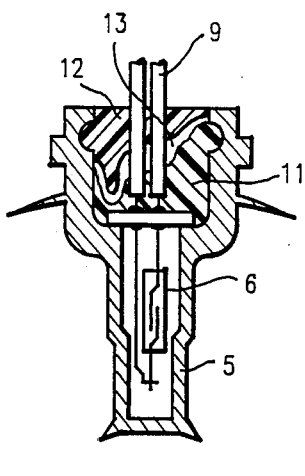
FIG. 6 is a sectional view showing another comparative example.

FIG. 6 shows another comparative example in which the upper layer sealing material has a larger specific gravity than that of the lower layer sealing material. In the figure, the reference numeral 11 denotes a lower layer sealing material, 12 an upper layer sealing material, and 13 a mixed layer.

As the upper layer sealing material 12, an epoxy ultraviolet-curing resin (ASCUR-003, manufactured by Aishin Seiki Co., Ltd.) having a specific gravity of 1.52 was employed, while, as a lower layer sealing material, an urethane acrylate ultraviolet-curing resin (S771-3, manufactured by Three Bond) having a specific gravity of 1.12 was employed, and these resins were simultaneously cured in the same conditions as in Example 1. In the case where the upper layer sealing material has a larger specific gravity than that of the lower layer sealing material as in this comparative example, when the upper layer sealing material is cast, it settles, and the mixed layer 13 is undesirably formed between the upper and lower layer sealing materials, as shown in FIG. 6.

Figure 7:
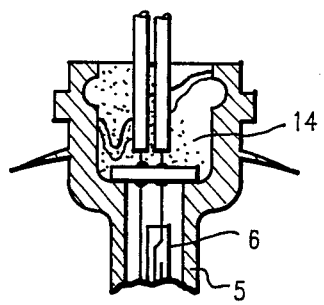
FIG. 7 is a sectional view showing the second comparative example which involves an uncured resin portion.

When, in this state, the sealing materials were cured, an uncured portion 14 was left as shown in FIG. 7.

EXAMPLE 2

Figure 8:
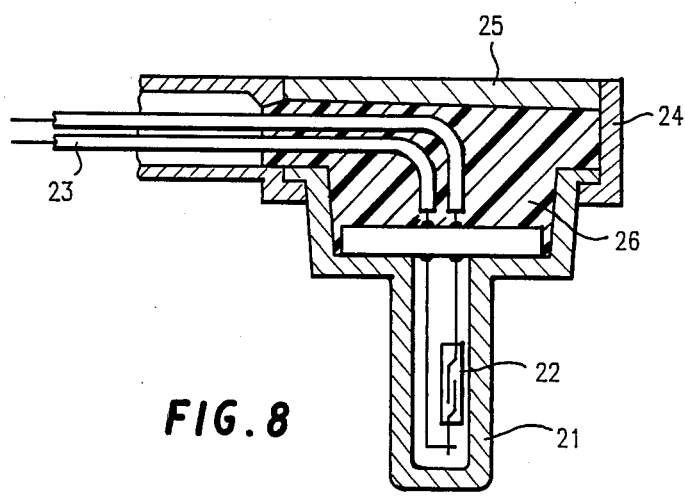
FIG. 8 is a sectional view showing another example of the present invention.

Referring next to FIG. 8, which shows another example in which the present invention is applied to a switch for an automotive speed sensor, the reference numeral 21 denotes a casing, 22 a reed switch, 23 lead wires, 24 a rubber boot, 25 an upper layer sealing material, and 26 a lower layer sealing material.

As the upper layer sealing material, an epoxy acrylate ultraviolet-curing resin (E-211, manufactured by Three Bond) having a specific gravity of 1.14 was employed, while, as a lower layer sealing material, an urethane acrylate ultraviolet-curing resin (ASCUR-001, manufactured by Aishin Seiki, Co., Ltd.) having a specific gravity of 1.28 was employed, and these resins were simultaneously cured under the same conditions as in Example 1.

Although the upper layer sealing material was cast immediately after the lower layer sealing material had been cast, these sealing materials were not mixed together but instead cured in two layers, respectively, which were completely separated from each other. The switch thus prepared was dipped in a brake oil at 120° C. for 72 hours to examine the sealing properties. There was no abnormality in the external appearance of the switch, and the insulation resistance between the lead wires showed $7 \times 10^7 \Omega$.

The problems of the prior art may also be eliminated by the following methods:

(1) An epoxy acrylate or epoxy ultraviolet-curing resin is given thermosetting of anaerobic curing property so as to be cured to a depth of 5 mm or more.

(2) A laminated structure is formed by stacking a plurality of layers of an epoxy acrylate or epoxy ultraviolet-curing resin, each layer being cured having a thickness of 2 to 3 mm.

However, method (1) involves the problem that an epoxy acrylate or epoxy ultraviolet-curing resin which is given a thermosetting or anaerobic curing property needs several hours to cure completely, while method (2) has the problem that the workpiece needs to be passed through an ultraviolet-light irradiation furnace many times.

In contrast, the method of the present invention, in which the two layers are cured simultaneously, enables sealing to be completed in a short period of time, advantageously. Obviously numerous modifications and variations of the present invention are possible in light of the above teachings. It is therefore to be understood that within the scope of the appended claims, the invention may be practiced otherwise than as specifically described herein.

What is claimed is:

1. A method of sealing an electronic part within a casing, comprising:
    positioning said electronic part within said casing;
    introducing two different ultraviolet-curing resins within said casing so as to form first and second layer portions, respectively, the resin employed for the first layer portion having a smaller specific gravity than that of the resin for the second layer portion before said resins are cured; and
    simultaneously curing said resins by irradiation with an ultraviolet ray so as to seal said electronic part within said casing.

2. A method of sealing an electronic part according to claim 1, wherein said ultraviolet-curing resin of said first layer portion comprises an epoxy acrylate, while said second layer portion comprises an urethane acrylate ultraviolet-curing resin.

3. A method of sealing an electronic part according to claim 1, wherein the thickness of said ultraviolet-curing resin of the first layer portion is from 0.5 mm to 3 mm.

4. A method of sealing an electronic part according to claim 1, wherein said ultraviolet-curing resin of said first layer portion comprises an epoxy resin, while said second layer portion comprises a urethane acrylate ultraviolet-curing resin.

* * * * *